United States Patent
Delia et al.

(10) Patent No.: US 7,548,952 B2
(45) Date of Patent: Jun. 16, 2009

(54) METHOD OF SENDING AN EMAIL TO A PLURALITY OF RECIPIENTS WITH SELECTIVE TREATMENT OF ATTACHED FILES

(75) Inventors: Wayne M Delia, Poughkeepsie, NY (US); William A Ma, Wappingers Falls, NY (US); William Hsioh-Lien Ma, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 576 days.

(21) Appl. No.: 10/160,522

(22) Filed: May 31, 2002

(65) Prior Publication Data
US 2003/0225837 A1  Dec. 4, 2003

(51) Int. Cl.
*G06F 15/16* (2006.01)
(52) U.S. Cl. ............... 709/206; 709/219; 455/412.1
(58) Field of Classification Search ............. 709/206
See application file for complete search history.

(56) References Cited

U.S. PATENT DOCUMENTS

| | | | |
|---|---|---|---|
| 5,548,745 A | 8/1996 | Egan et al. | |
| 5,781,901 A * | 7/1998 | Kuzma | 707/10 |
| 5,903,723 A * | 5/1999 | Beck et al. | 709/205 |
| 6,073,133 A * | 6/2000 | Chrabaszcz | 707/10 |
| 6,092,114 A * | 7/2000 | Shaffer et al. | 709/232 |
| 6,101,320 A * | 8/2000 | Schuetze et al. | 709/206 |

(Continued)

FOREIGN PATENT DOCUMENTS

JP  2000215120 A  8/2000

(Continued)

OTHER PUBLICATIONS

Karnouskos, S. "Active Electronic Mail." Proceedings of the 2002 ACM Symposium on Applied Computing. Mar. 2002. ACM Press. pp. 801-806.*

(Continued)

*Primary Examiner*—Larry D Donaghue
*Assistant Examiner*—Jeffrey R Swearingen
(74) *Attorney, Agent, or Firm*—DeLio & Peterson LLC; Robert Curcio

(57) ABSTRACT

A method of sending an email message having one or more attached files to a plurality of recipients allows customized treatment of each file as it is being sent to each recipient. Treatments may include different types of encryption, plain text transmission, security classification or user-defined treatments. The invention may be implemented in a client-server configuration with separate client and server programs or in a single integrated email program configuration for use on a single computer. The user is presented with a list of recipients, selects a recipient and then selects a treatment for each file to be used when that file is sent to the selected recipient. This process is repeated for each recipient and each file. A control file is generated by the client program, including the recipient information and the file treatment information for each recipient and each file. The client program sends a single copy of the email message, a single copy of each file and the control file to the server program. The server program reads the control file and prepares individualized emails for each recipient by applying the control file specified treatments for each attached file.

13 Claims, 2 Drawing Sheets

U.S. PATENT DOCUMENTS

| | | |
|---|---|---|
| 6,115,472 A | 9/2000 | Shimizu et al. |
| 6,185,683 B1 * | 2/2001 | Ginter et al. ................ 713/176 |
| 6,192,396 B1 * | 2/2001 | Kohler ........................ 709/206 |
| 6,247,045 B1 * | 6/2001 | Shaw et al. ................. 709/207 |
| 6,256,672 B1 * | 7/2001 | Redpath ..................... 709/206 |
| 6,272,485 B1 * | 8/2001 | Sragner ...................... 709/219 |
| 6,275,848 B1 * | 8/2001 | Arnold ....................... 709/206 |
| 6,275,850 B1 * | 8/2001 | Beyda et al. ................ 709/206 |
| 6,304,898 B1 | 10/2001 | Shiigi |
| 6,327,612 B1 * | 12/2001 | Watanabe ................... 709/206 |
| 6,332,164 B1 | 12/2001 | Jain |
| 6,460,074 B1 * | 10/2002 | Fishkin ...................... 709/206 |
| 6,546,417 B1 * | 4/2003 | Baker ......................... 709/206 |
| 6,598,076 B1 * | 7/2003 | Chang et al. ................ 709/206 |
| 6,650,890 B1 * | 11/2003 | Irlam et al. ............. 455/412.1 |
| 6,721,784 B1 * | 4/2004 | Leonard et al. ............. 709/206 |
| 6,775,689 B1 * | 8/2004 | Raghunandan ............. 709/206 |
| 6,859,213 B1 * | 2/2005 | Carter ........................ 715/752 |
| 6,970,908 B1 * | 11/2005 | Larky et al. ................. 709/206 |
| 7,089,286 B1 * | 8/2006 | Malik ......................... 709/206 |
| 7,111,046 B2 * | 9/2006 | Watanabe et al. ........... 709/206 |
| 7,136,897 B1 * | 11/2006 | Raghunandan ............. 709/206 |
| 2002/0013817 A1 * | 1/2002 | Collins et al. ............... 709/206 |
| 2002/0091776 A1 * | 7/2002 | Nolan et al. ................ 709/206 |
| 2002/0112010 A1 * | 8/2002 | Soroker et al. .............. 709/206 |
| 2003/0172119 A1 * | 9/2003 | Hosali et al. ................ 709/206 |

FOREIGN PATENT DOCUMENTS

| | | |
|---|---|---|
| WO | WO 00/42748 | 7/2000 |
| WO | WO 01/73530 A2 | 10/2001 |

OTHER PUBLICATIONS

Postel, J. RFC 821: Simple Mail Transfer Protocol. Aug. 1982.*
Eckel, B. *A Web Application for Electronic Mail Address Collection.* (Abstract).
Eckel, B. Web techniques. *A Web Application*, pp. 1-11. http://www/webtechniques.com/archives/1998/01/java/1.
Web Techniques: Listing 1—http://www/webtechniques.com/cgi-bin/1stpopup/archives/1998/01/java/.
Web Techniques: Listing 2—http://www/webtechniques.com/cgi-bin/1stpopup/archives/1998/01/java/2.
Web Techniques: Listing 3—http://www/webtechniques.com/cgi-bin/1stpopup/archives/1998/01/java/3.
Wallach, D. et al. Extensible Security Architectures for Java. pp. 116-128 (1997).
International Business Machines Corp. *Java Applet Attached to E-Mail.* Research Disclosure, Jun. 1998, p. 806.
International Business Machines Corp. *Java Applet Attached to E-Mail.* Research Disclosure, Apr. 1998, p. 462.

* cited by examiner

METHOD OF SENDING AN EMAIL TO A PLURALITY OF RECIPIENTS WITH SELECTIVE TREATMENT OF ATTACHED FILES

BACKGROUND OF THE INVENTION

1. Field of the Invention

The present invention relates to a method of handling files attached to an email when the email and the files are being sent to multiple recipients. More specifically, the invention relates to a method of applying different treatments to the attached files, corresponding to the different recipients, as the files are being sent with the email.

2. Description of Related Art

Conventional email systems that allow the attachment of external files to outgoing emails require that each attached file receive the same treatment within a single email. For example, consider an email addressed to three recipients (Recipient 1, Recipient 2 and Recipient 3) having two attached external files (File 1 and File 2). A conventional email system will send each of the three recipients a copy of the email message and identical copies of both of the attached external files.

Some email systems allow attached files to be encrypted. If the user specifies encryption, each of the two files will be encrypted and each of the three recipients will receive the same encrypted version of the two external files. Any variation from this absolute set of treatments for attached files requires that the sender create separate emails. If the sender wants Recipient 1 to receive only an unencrypted copy of File 1, while Recipient 2 is to receive encrypted copies of both files and Recipient 3 is to receive only an unencrypted copy of File 2, then the sender must prepare three separate email transmissions.

This type of situation will occur frequently when multiple files containing different levels of detail are to be delivered to recipients located in countries having different file encryption requirements set by corporate policy or by regulation. Recipient 1 may be an executive who should receive File 1 containing only summary information and low-level details. If Recipient 1 is accessible through a secure local network, or is located in the same country as the sender, corporate policy may permit or the situation may require that File 1 be sent unencrypted.

Recipient 2, however, may need to receive detailed confidential information in File 2 in addition to the information in File 1. Recipient 2 may be based at a remote location in a different country, and may be accessible only through an insecure email link. In this case, Files 1 and 2 may need to be encrypted to conform to applicable export regulations or simply to protect important confidential information. Finally, Recipient 3 may be an engineer who needs only the details in File 2, but corporate policy requires encryption for such transmissions.

Using a traditional email client program, the sender would be required to send three separate emails with customized selections for the file to be attached to each message and the encryption to be used. If the sender wants to encrypt some files, but not others, it may even be necessary to send multiple copies of the same email to one or more recipients so that the treatment of each attached file can be varied.

Bearing in mind the problems and deficiencies of the prior art, it is therefore an object of the present invention to provide a method of sending an email having one or more attached files to a plurality of recipients which allows the attached files to be handled in different way when being sent to the different recipients.

It is another object of the present invention to provide the method of the invention in a client-server implementation and in a single computer implementation.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, to a method of sending an email to a plurality of recipients including the steps of: determining if a file is to be attached to the email, selecting a treatment for the file corresponding to each recipient, and sending the email to each recipient with the attached file treated according to the selected treatment for each recipient.

The step of selecting a treatment for the file corresponding to each recipient preferably includes the steps of: displaying a list of the recipients, displaying a list of available treatments, and selecting a treatment for the file corresponding to each recipient in the displayed list of recipients.

The method of sending an email to a plurality of recipients may also include the additional steps of: determining if an additional recipient is designated, displaying a list of available treatments, and selecting a treatment for the file for the additional recipient from the list of available treatments.

When the user wishes to attach an additional file to the email, the method of the invention includes displaying a list of the previously designated recipients, and then selecting a treatment for the additional file corresponding to each recipient in the displayed list of recipients.

The method of the invention may be implemented on a single computer or in a client-server configuration. In the single computer implementation the steps of determining if a file is to be attached to the email, selecting a treatment for the file and sending the email are all performed on a single computer. In the client-server configuration the steps of determining if a file is to be attached to the email and selecting a treatment for the file are performed on the client computer and the step of sending the email to each recipient is performed on the server computer.

In the most highly preferred embodiment of the client-server configuration, the method of sending an email to a plurality of recipients also includes the steps of: preparing a control file on the client computer, the control file including information designating the treatment for each recipient, sending the control file, the email and the attached file to the server computer, and reading the control file at the server computer to determine the selected treatment for each recipient.

The invention is also directed to an email computer program product for sending an email to a plurality of recipients. The email computer program product includes: computer readable program code means for determining if a file is to be attached to the email, computer readable program code means for selecting a treatment for the file corresponding to each recipient, and computer readable program code means for sending the email to each recipient with the attached file treated according to the selected treatment for each recipient.

In this aspect of the invention, the program code means for selecting a treatment for the file corresponding to each recipient preferably comprises: computer readable program code means for displaying a list of the recipients, computer readable program code means for displaying a list of available treatments, and computer readable program code means for selecting a treatment for the file corresponding to each recipient in the displayed list of recipients.

The computer readable program code means may also be organized into an email client computer program product for preparing an email to be sent to a plurality recap of recipients and an email server computer program product for sending a prepared email with at least one attached file to a plurality of recipients.

The email client computer program product for preparing the email includes: computer readable program code means for determining if a file is to be attached to the email, computer readable program code means for selecting a treatment for the file corresponding to each recipient, computer readable program code means for preparing a control file on a client computer, the control file including information designating the treatment for each recipient, and computer readable program code means for transmitting the control file, the email and the attached file to a server computer.

The email server computer program product for sending the prepared email includes: computer readable program code means for receiving a prepared email having at least one attached file and an associated control file, the control file including information designating a treatment for each of the plurality of recipients, and computer readable program code means for sending the prepared email to each recipient with the at least one attached file treated according to the designated treatment in the control file.

BRIEF DESCRIPTION OF THE DRAWINGS

The features of the invention believed to be novel and the elements characteristic of the invention are set forth with particularity in the appended claims. The invention itself, however, both as to organization and method of operation, may best be understood by reference to the detailed description which follows taken in conjunction with the accompanying drawings in which:

DESCRIPTION OF THE PREFERRED EMBODIMENT(S)

The present invention may be implemented in two separate computer programs, comprising a client program (as seen in the flow diagram of FIG. 1) running on one or more client computers and a server program (FIG. 2) running on a server computer. Alternatively, the invention may be implemented on a stand-alone computer as a single program that integrates both client and server functions.

In the preferred client-server implementation of the invention, the client program allows users to prepare emails, attach files, specify recipients to receive the files and specify treatments for each file to be sent to a recipient. The client computer sends a single copy of the email and a single copy of each file to the server computer. The client computer also sends the server a control file specifying which of the attached files are to be sent to each recipient and the treatments to be applied to each file when the server computer sends the email to each recipient. The server program applies the treatments to the files and prepares the emails to the recipients according to the instructions in the control file.

The term "treatments" as used herein may include such things as:

1) including (or excluding) the file attachment to a particular recipient, 2) encrypting the attached file according to a selected encryption scheme from among one or more available encryption schemes, 3) sending the file unencrypted, or 4) applying a custom, user-defined treatment, such as applying a security classification, or performing another type of customized processing for the attached file.

When the present invention is implemented as a single integrated program (embodying both the client and server functionality), the control file need not be attached to the email, but is merely stored internally for use during the server processing phase.

The present invention includes the client program, the server program, the combination of both the client and server programs, and to the single computer configuration. The description below, however, is directed to the client-server configuration. The single computer design is functionally identical except that the generation of a separate control file and the attachment of that file to the email is not needed.

Figure 1:
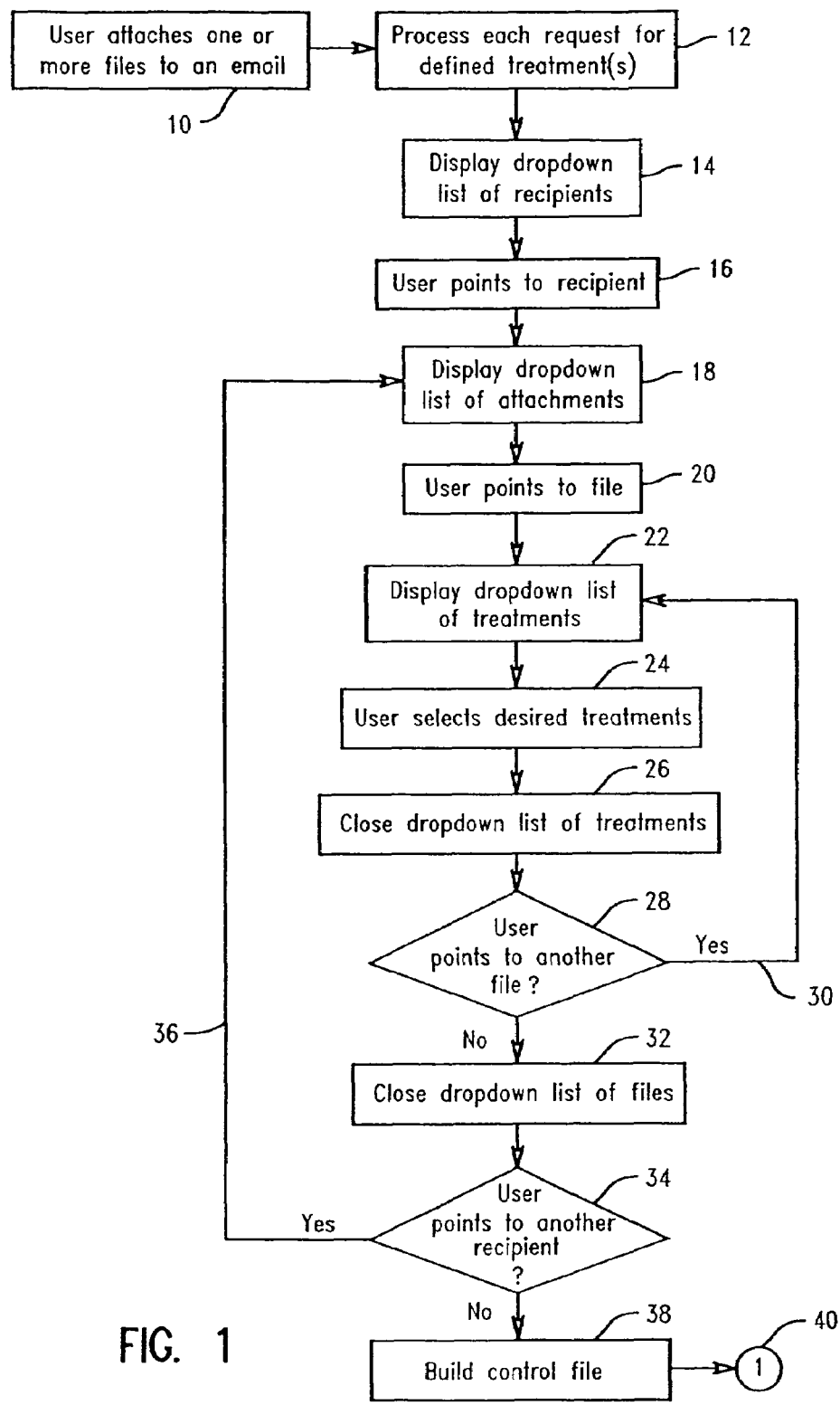
FIG. 1 is a program flow diagram illustrating the client portion of the present invention suitable for execution on a client computer.

Referring to FIG. 1, the method of the present invention is initiated at step 10 when the user attaches one or more files to an email. Prior to this step, the user will have opened a client email program incorporating this invention and will have begun the creation of an email in a conventional manner and specified the recipients for the email. All of these preliminary steps are well known to those skilled in this field and are implemented in many email programs currently available. Accordingly, known preliminary steps are not shown in FIG. 1 and step 10 is the first step in the present invention, which is part of a larger email program.

Program flow proceeds to step 12 in which each request for a defined file treatment is processed. In step 14, the client program displays a dropdown list of recipients to the program user. The dropdown list allows the user to see all of the recipients he has previously designated for this email. In step 16, the user points to one of the recipients in the dropdown list so that he can customize the treatment for the files to be sent to that recipient.

In step 18 the program displays a dropdown list of files attached to this email corresponding to the files previously added by the user in step 10. This allows the user to customize the treatments for each file to be sent to the recipient selected in step 16. In step 20, the user selects a particular file by pointing to it. The program responds in step 22 by displaying a dropdown list of available treatments for this file.

In step 24, the user selects the desired treatment for this file when it is being sent to the recipient selected in step 16. In step 26 the user closes the dropdown list of treatments. At the conclusion of step 26, the user will have specified the treatments to be applied to the file selected in step 20 when that file is sent to the user selected in step 16.

In decision block 28, the user is able to point to another file being sent to the same recipient selected in step 16. If the user selects another file, the program returns to step 22 via branch 30. The available treatments are then displayed for the newly selected file. This cycle of pointing to a new file and looping through branch 30 back to step 22 continues until the user has finished specifying treatments for all of the files added in step 10. At that point, program flow proceeds to step 32 and the dropdown list of files opened in step 18 is closed.

After the list of files is closed in step 32, the dropdown list of recipients originally displayed in step 14 will become visible. In step 34 the user may select another recipient from that dropdown list of recipients, and, provided he does so, program flow will return to step 18 via branch 36. Steps 18 through 32 will then be repeated as described above for the second recipient.

Program flow will loop through branch 30 for the second recipient until all of the files attached in step 10 have been assigned the desired treatment. The email program will typically allow a default file treatment to be set by the user so that only treatments that differ from the default will need to be selected by the user.

Program flow continues through branch 36 until treatments for all files and all recipients have been specified. Program flow then proceeds to step 38 in which the control file is constructed. The control file includes a list of all of the recipients, a list of all of the files being sent, and a list of all the treatments applicable to each file when it is sent to each specified recipient.

Those of skill in the art will recognize that the process described above may be implemented or modified in many different ways. The files may be attached individually or in groups. If additional files are attached or additional recipients specified after the program portion in FIG. 1 is completed, that program portion will be executed again for the additional files or recipients. Radio buttons, check boxes, multiple dropdown lists or other conventional methods may be used to identify the selections for file treatments. The program may be implemented in HTML or in a lower level programming language.

In the case where the client and server aspects of the program are combined, the control file may be stored in memory and the information used when necessary by the server portion of the program. However, in the preferred embodiment shown in FIG. 1, the control file, the email message and a single copy of each file being attached are sent to another computer (the server) operating the server program illustrated in FIG. 2. That process, which includes sending the control file, the email message and the attached files through a network to the server computer is signified by the encircled "1" marked with reference numeral 40.

In the preferred design the client program can be running on multiple different client computers, and each client sends only a) one copy of each attached file, b) one copy of the email message, and c) one control file to the server for each email.

Figure 2:
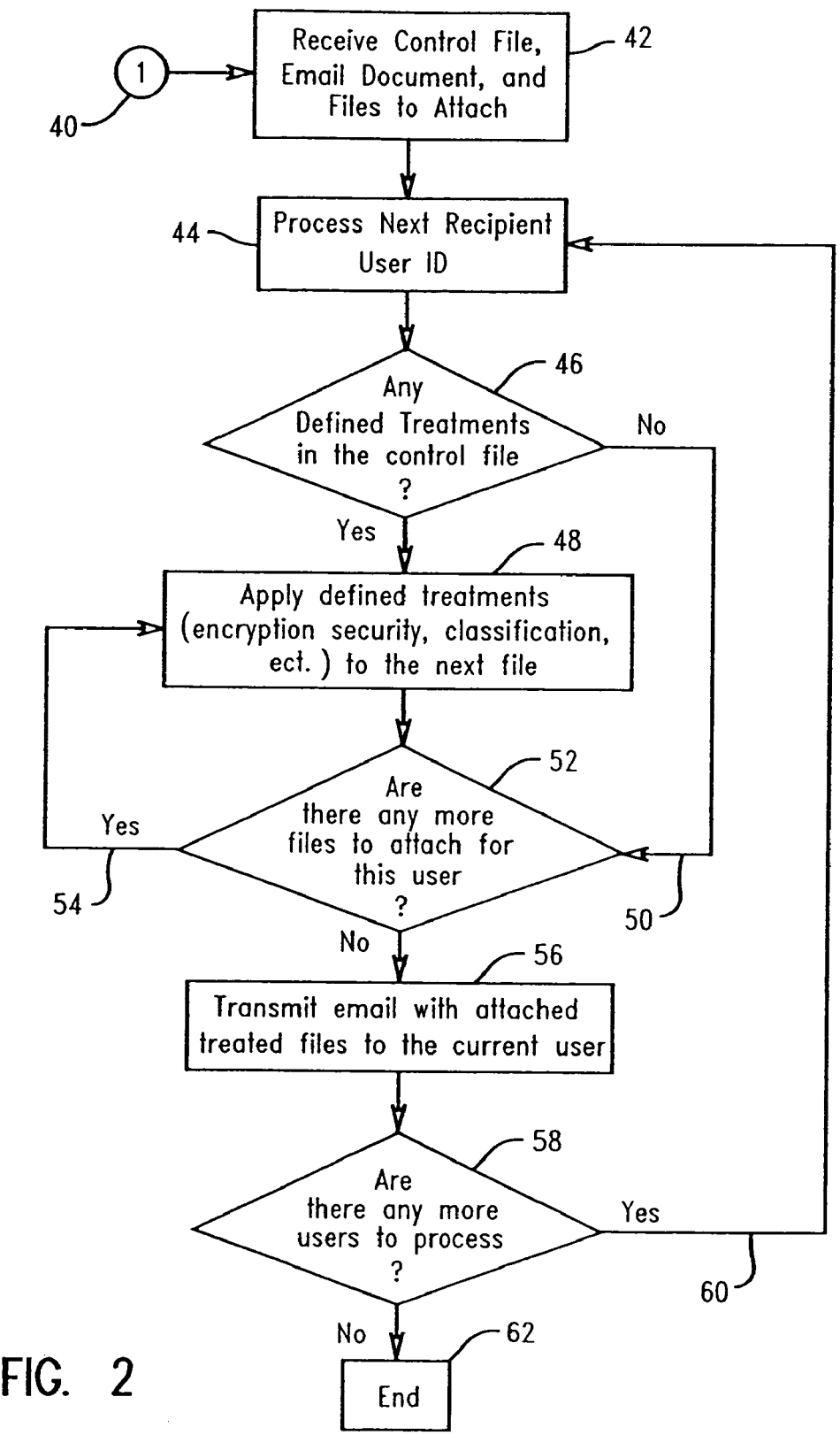
FIG. 2 is a program flow diagram illustrating the server portion of the present invention suitable for execution on a server computer.

Referring to FIG. 2, in step 42, the server program running on the server computer receives the email, the control file and the attached files. In step 44, the server begins processing by opening the control file and identifying the first recipient. In decision step 46, the server program determines if there are any defined treatments in the control file for the first file being sent to the first recipient. If there are, flow proceeds to step 48 and the defined treatments are applied. If there are no defined treatments in the control file for the to the first file being sent to the first recipient, flow proceeds along branch 50 to step 52.

In step 52, the server program determines if there is a second file for the first recipient, and if there is, program flow returns to step 48 on branch 54. In the second pass through step 48, the treatment for the second file being sent to the first recipient is applied. Program flow continues through branch 54 until the treatments for all the files being sent to the first recipient are applied. Program flow then proceeds to step 56 and the first email is sent to the first recipient with the attached files receiving the specified treatments.

In decision block 58, the program determines if there are any additional recipients. If there are, program flow returns to step 44 on branch 60 and the processing continues for the second recipient to apply all the treatments specified for files being sent to the second recipient. Program flow continues as described above, cycling through step 58 and branch 60 until emails have been sent to all specified recipients. Program flow then ends at block 62.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method of sending an email to a plurality of recipients comprising the steps of:
   preparing the email on a client computer;
   designating each one of the plurality of recipients on the client computer;
   determining if an attachment file is to be attached to the email;
   selecting from among a plurality of available treatments a treatment for the attachment file corresponding to each recipient, the plurality of available treatments including at least two different treatments for sending the attachment file and one treatment corresponding to not sending the attachment file, whereby a different treatment may be selected for each recipient from among the plurality of available treatments, the steps of determining if an attachment file is to be attached to the email and selecting a treatment for the attachment file being performed on the client computer;
   preparing a control file on the client computer, the control file including information designating the treatment for the attachment file corresponding to each recipient;
   sending one copy of the control file, one copy of the email and one copy of the attachment file to a server computer;
   reading the control file at the server computer to determine the selected treatment for the attachment file for each recipient; and
   sending multiple copies of the email from the server computer, one copy being sent to each recipient with the attachment file being treated by the server according to the information in the control file designating the selected treatment for each recipient.

2. The method of sending an email to a plurality of recipients according to claim 1 wherein the step of selecting a treatment for the attachment file corresponding to each recipient comprises the steps of:
   displaying a list of the recipients on the client computer;
   displaying a list of available treatments on the client computer; and
   selecting a treatment for the file corresponding to each recipient in the displayed list of recipients.

3. The method of sending an email to a plurality of recipients according to claim 2 further including the steps of:
   determining if an additional recipient is designated;
   displaying a list of available treatments on the client computer; and
   selecting a treatment for the file for the additional recipient from the list of available treatments.

4. The method of sending an email to a plurality of recipients according to claim 2 further including the steps of:
   determining if an additional file is to be attached;
   displaying a list of the recipients on the client computer; and selecting a treatment for the additional file corresponding to each recipient in the displayed list of recipients.

5. A method of preparing an email on a client computer to be sent to a plurality of recipients comprising:

determining if a file is to be attached to the email;

selecting from among a plurality of available treatments a treatment for the file corresponding to each recipient, whereby a different treatment may be selected for each recipient from among the plurality of available treatments, where the selecting a treatment for the attachment file is performed on the client computer;

preparing a control file on the client computer, the control file including information designating the treatment for each recipient; and transmitting the control file, the email and the attached file to a server computer.

6. A method of sending a prepared email having at least one attached file from a server computer to a plurality of recipients comprising:

receiving a prepared email having at least one attached file and an associated control file, the control file including information designating a treatment from among a plurality of available treatments for each of the plurality of recipients the plurality of available treatments including at least two different treatments for sending the at least one attached file and one treatment corresponding to not sending the at least one attached file, where the designating a treatment for the at least one attached file occurs on the client computer; and sending the prepared email to each recipient with the at least one attached file treated according to the designated treatment in the control file, whereby a different designated treatment for the at least one attached file may be used for each different recipient.

7. An email computer program product for sending an email to a plurality of recipients, the email computer program product comprising:

a computer readable medium having computer readable program code means embodied therein, the email computer program product having:

computer readable program code means for preparing the email on a client computer;

computer readable program code means for designating each one of the plurality of recipients on the client computer;

computer readable program code means for determining if an attachment file is to be attached to the email;

computer readable program code means for selecting from among a plurality of available treatments a treatment for the attachment file corresponding to each recipient, the plurality of available treatments including at least two different treatments for sending the attachment file and one treatment corresponding to not sending the attachment file, whereby a different treatment may be selected for each recipient from among the plurality of available treatments, wherein the selecting occurs on the client computer;

computer readable program code means for preparing a control file on the client computer, the control file including information designating the treatment for the attachment file corresponding to each recipient;

computer readable program code means for sending one copy of the control file, one copy of the email and one copy of the attachment file to a server computer;

computer readable program code means for reading the control file at the server computer to determine the selected treatment for the attachment file for each recipient; and computer readable program code means for sending multiple copies of the email from the server computer, one copy being sent to each recipient with the attachment file being treated according to the information in the control file designating the selected treatment for each recipient.

8. The email computer program product for sending an email to a plurality of recipients according to claim 7 wherein the computer readable program code means for selecting a treatment for the attachment file corresponding to each recipient comprises:

computer readable program code means for displaying a list of the recipients on the client computer;

computer readable program code means for displaying a list of available treatments on the client computer; and computer readable program code means for selecting a treatment for the file corresponding to each recipient in the displayed list of recipients.

9. The email computer program product for sending an email to a plurality of recipients according to claim 8 further including:

computer readable program code means for determining if an additional recipient is designated;

computer readable program code means for displaying a list of available treatments on the client computer; and computer readable program code means for selecting a treatment for the file for the additional recipient from the list of available treatments.

10. The email computer program product for sending an email to a plurality of recipients according to claim 8 further including:

computer readable program code means for determining if an additional file is to be attached;

computer readable program code means for displaying a list of the recipients on the client computer; and computer readable program code means for selecting a treatment for the additional file corresponding to each recipient in the displayed list of recipients.

11. An email server computer program product for sending a prepared email with at least one attached file to a plurality of recipients, the email server computer program product comprising:

a computer readable medium having computer readable program code means embodied therein, the email server computer program product having:

computer readable program code means for receiving a prepared email having at least one attached file and an associated control file, the control file including information designating a treatment for each of the plurality of recipients, the designated treatment for each of the plurality of recipients having been previously selected on a client computer from among a plurality of available treatments, the plurality of available treatments including at least two different treatments for sending the file and one treatment corresponding to not sending the file, whereby a different treatment may be designated in the control file for each different recipient from among the plurality of available treatments; and computer readable program code means for sending the prepared email to each recipient with the at least one attached file treated according to the designated treatment for each recipient in the control file.

12. A computer usable medium having computer readable program code means embodied therein to perform method steps for preparing an email on a client computer to be sent to a plurality of recipients, said method steps comprising:
  preparing the email on a client computer;
  designating each one of the plurality of recipients on the client computer;
  determining if an attachment file is to be attached to the email;
  selecting from among a plurality of available treatments a treatment for the attachment file corresponding to each recipient, the plurality of available treatments including at least two different treatments for sending the attachment file and one treatment corresponding to not sending the attachment file, whereby a different treatment may be selected for each recipient from among the plurality of available treatments, the steps of determining if an attachment file is to be attached to the email and selecting a treatment for the attachment file being performed on the client computer;
  preparing a control file on the client computer, the control file including information designating the treatment for each recipient; and
  transmitting the control file, the email and the attached file to a server computer.

13. A program storage device readable by a machine, tangibly embodying a program of instructions executable by the machine to perform method steps for sending a prepared email having at least one attached file from a server computer to a plurality of recipients, said method steps comprising:
  receiving a prepared email having at least one attached file and an associated control file from a client computer, the control file including information designating a treatment for each of the plurality of recipients, the designating treatment for each of the plurality of recipients having been previously selected on a client computer from among a plurality of available treatments, the plurality of available treatments including at least two different treatments for sending the file and one treatment corresponding to not sending the file, whereby a different treatment may be designated in the control file for each recipient from among the plurality of available treatments; and
  sending the prepared email to each recipient with the at least one attached file treated according to the designated treatment for each recipient in the control file.

* * * * *